United States Patent [19]
Siepker

[11] Patent Number: 5,842,920
[45] Date of Patent: Dec. 1, 1998

[54] GRAIN CART PERISCOPE

[76] Inventor: Gary Siepker, 5469 220th Ave., Albert City, Iowa 50510

[21] Appl. No.: 871,149

[22] Filed: Jun. 9, 1997

[51] Int. Cl.[6] ..................................................... A01F 12/00
[52] U.S. Cl. .......................... 460/119; 460/149; 414/345
[58] Field of Search ..................................... 460/119, 114, 460/115, 149, 150, 903; 414/340, 345, 389, 398

[56] References Cited

U.S. PATENT DOCUMENTS

| | | |
|---|---|---|
| 1,631,024 | 5/1927 | Fisher . |
| 2,374,027 | 4/1945 | McMaster et al. . |
| 2,512,792 | 6/1950 | Delaney . |
| 2,552,569 | 5/1951 | McNamara . |
| 2,915,205 | 12/1959 | Strader . |
| 3,174,648 | 3/1965 | Nelson . |
| 3,280,700 | 10/1966 | Donnelly et al. . |
| 3,357,576 | 12/1967 | Strombeck et al. . |
| 3,964,620 | 6/1976 | Parsons . |
| 4,614,477 | 9/1986 | Hagenbuch . |
| 5,529,537 | 6/1996 | Johnson ............................... 460/150 X |
| 5,749,783 | 5/1998 | Pollkhas .................................. 460/119 |

*Primary Examiner*—Terry Lee Melius
*Attorney, Agent, or Firm*—Zarley, McKee, Thomte, Voorhees & Sease

[57] ABSTRACT

A periscope of the present invention is adapted to allow a farmer to monitor the inside of a wagon while it is being filled with grain from a grain cart. In this way, the farmer will know when the wagon is full and can prevent the wagon from overfilling and spilling grain. The top mirror of the periscope is convex in shape and can be adjusted to change the field of view.

22 Claims, 2 Drawing Sheets

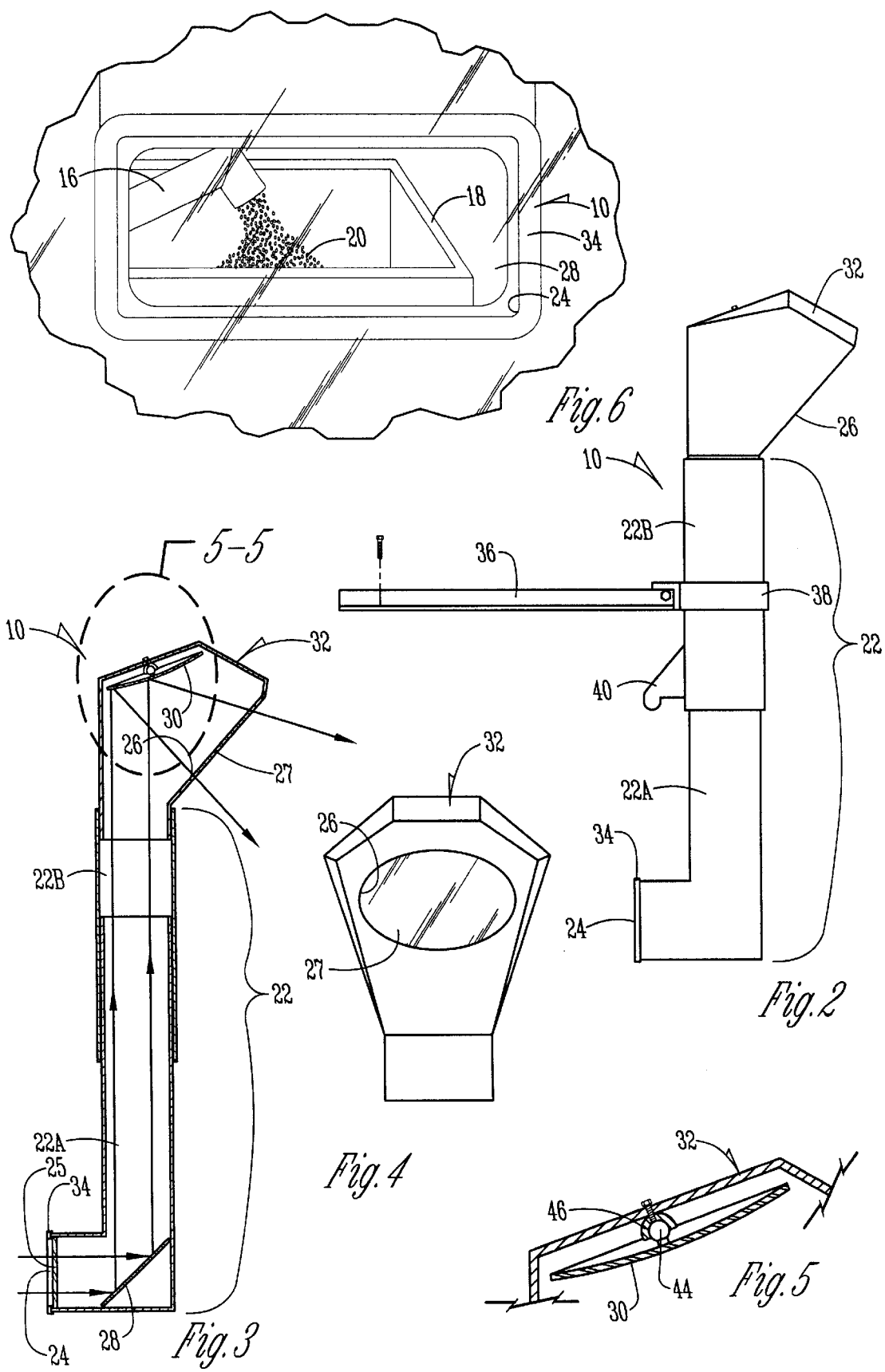

5,842,920

GRAIN CART PERISCOPE

BACKGROUND OF THE INVENTION

1. Field of the Invention

The present invention relates to grain carts. More particularly, though not exclusively, the present invention relates to an apparatus and method for monitoring the filling of a wagon from a grain cart.

2. Problems in the Art

When a farmer harvests row crops such as corn or soybeans a farmer will use a combine having an internal grain storage bin which periodically needs to be emptied.

Typically, the farmer will empty the grain from the combine into a grain cart pulled by a tractor. The grain cart has large, wide wheels which will not compact the ground as much as a grain wagon will. The grain cart will eventually be emptied into one or more gravity wagons for transportation to a storage location. Typically, the driver of the grain cart will pull the tractor along side an empty gravity wagon where the grain is augured out of the grain cart into the wagon. The wagons typically have high sides so that a large amount of grain can be contained within the sides.

The main problem with the prior art is that the farmer in the cab of the tractor pulling the grain cart cannot see the grain as it is unloaded from the grain cart into the wagons since the wagons have walls higher than the line of sight of the farmer. As a result, the farmer cannot know when to stop filling the wagon, and often several bushels of grain are spilled onto the ground. This grain spillage can be extremely costly.

One typical prior art solution is to have a person standing on a ladder looking into the wagon while the grain cart is filling the wagon. The person can signal the farmer in the cab of the tractor when to stop filling the wagon. While this method is effective, it requires an additional person and also requires extra time for the person to climb the ladder and signal to the farmer. If an additional person is not used to climb the ladder, the farmer must use a "best guess" as to when the wagon is full. Typically, rather than tying up a second person, farmers rely on the "best guess" method resulting in either grain spillage, or wagons that are not filled to their capacities.

It can therefore be seen that there is a need for an easy and effective device for monitoring the filling of a wagon with grain.

FEATURES OF THE INVENTION

A general feature of the present invention is a provision of a method and apparatus for monitoring a wagon while it is being filled with grain which overcomes problems found in the prior art.

A further feature of the present invention is the provision of a method and apparatus for monitoring a wagon while it is being filled with grain using a periscope mounted to the tractor.

Further features, objects, and advantages of the present invention include:

A method and apparatus for the monitoring the filling of a wagon which uses a periscope having a convex mirror for providing a wide angle view.

A method and apparatus for the monitoring the filling of a wagon using a periscope which is adjustable in height.

A method and apparatus for the monitoring the filling of a wagon using a periscope having an enlarged hood for facilitating a wide angle view.

A method and apparatus for the monitoring the filling of a wagon using a periscope having a swivel joint for pointing the periscope in any desired direction.

A method and apparatus for the monitoring the filling of a wagon using a periscope having a protective rubber gasket formed between the periscope and the window of a tractor cab.

A method and apparatus for the monitoring the filling of a wagon using a periscope and including a spotlight for illuminating the wagon.

These as well as other features, objects, and advantages of the present invention will become apparent from the following specification and claims.

SUMMARY OF THE INVENTION

The apparatus of the present invention is used by a farmer to monitor a wagon while it is being filled with grain from a grain cart. The invention is comprised of a periscope coupled to the cab of the tractor in such a way that the farmer can look through the periscope and see down into the wagon being filled. The present invention may optionally include a top mirror which is convex in shape to provide a wider angle of view. The convex mirror may also be adjustable to adjust the field of view.

BRIEF DESCRIPTION OF THE DRAWINGS

FIG. 2 is a side view of the periscope of the present invention.

FIG. 3 is a sectional view of the periscope of the present invention.

FIG. 4 is a front view of the hood used with the periscope of the present invention.

FIG. 5 is a partial enlarged sectional view taken along line 5—5 of FIG. 3.

FIG. 6 is a view taken along line 6—6 of FIG. 1 showing what the user would see looking through the periscope of the present invention.

DETAILED DESCRIPTION OF THE PREFERRED EMBODIMENT

Figure 1:
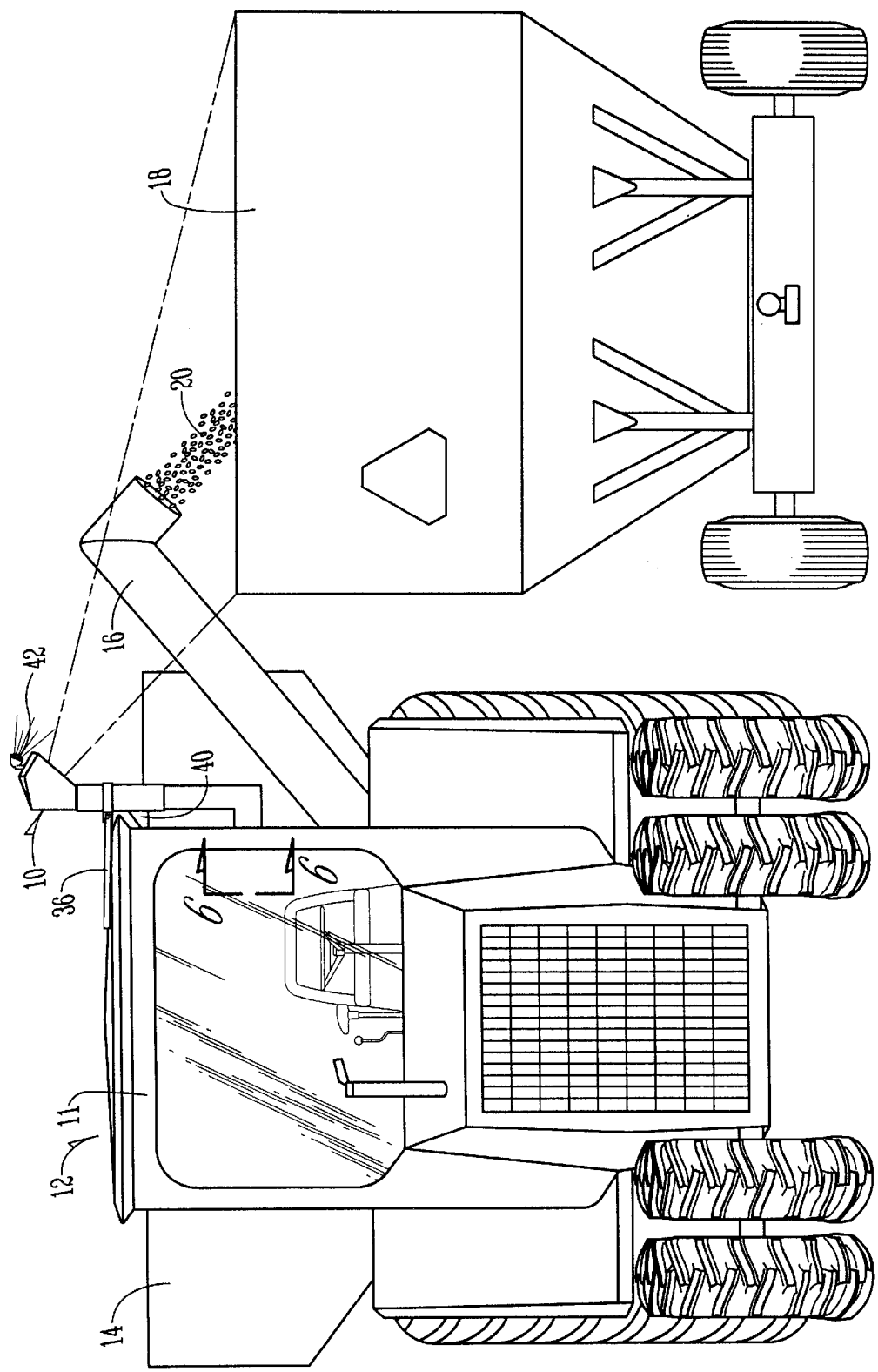
FIG. 1 is a front view of a tractor, grain cart, and grain wagon being used with the present invention.

The present invention will be described as it applies to its preferred embodiment. It is not intended that the present invention be limited to the described embodiment. It is intended that the invention cover all alternatives, modifications, and equivalencies which may be included within the spirit and scope of the invention.

FIG. 1 shows a periscope 10 of the present invention mounted to the cab 11 of a tractor 12. The tractor 12 is shown pulling a grain cart 14 having an auger 16 for unloading grain from the grain cart 14. Parked beside the tractor 12 and grain cart 14 is a gravity wagon 18. FIG. 1 shows grain 20 being unloaded from the grain cart 14 into the wagon 18.

FIGS. 2–5 show the periscope 10 of the present invention in detail. FIG. 2 is a side view of the periscope 10 shown in FIG. 1. FIG. 3 shows a sectional view of the periscope 10. The periscope 10 includes an elongated vertical tube 22 having a bottom opening 24 and a top opening 26. The tube 22 is preferably comprised of two separate sections of tubing 22A and 22B. The tube 22A is slightly smaller than tube 22B such that the tube 22A is slidably movable within the tube 22B. This allows the tube 22 to be adjustable in length, allowing the user to adjust the height of the periscope 10 for various sized wagons or tractors.

The openings 24 and 26 are shown as being covered by panes of glass 25 and 27, respectively. The glass panes 25 and 27 will help to keep dirt and debris out of the periscope 10. Alternatively, the openings 24 and 26 could simply be openings without any glass or other transparent material. In addition, the tube 22 is shown as a cylindrical tube, although the tube 22 can take on any cross-sectional shape, for example a rectangle (see FIG. 6).

Located near the bottom opening 24 is a first, bottom mirror 28 disposed at an angle of approximately 45° with the reflective side of the mirror facing upward (FIG. 3). Disposed near the top opening 26 is a second, top mirror 30 (FIG. 3). The top mirror 30 is disposed at an angle with the reflective side of the mirror 30 facing downward. With the top and bottom mirrors 30 and 28 disposed in this manner, light can travel through the top opening 26 where it is reflected off the top mirror 30, down through the vertical tube 22, where it is reflected off the bottom mirror 28 through the bottom opening 24. In this way, the user can look through the bottom opening 24 and see objects as if the user was looking through the top opening 26.

The top mirror 30 is preferably comprised of a downwardly facing convex mirror. By using a convex shaped mirror, a wider angle of view can be seen by the user through the periscope 10. To facilitate the wider angle of sight through the periscope 10, the hood 32 formed at the top of the tube 22 and defining the top opening 26 is preferably enlarged as shown in FIG. 4. The hood 32 along with the mirror 30 is rotatable relative to the tube 22 so that the line of sight of the periscope 10 can be rotated and the periscope can be aimed in any desired direction.

The bottom opening 24 preferably has a rubber gasket 34 that is adapted to abut against the side glass of the cab 11 when the periscope 10 is mounted to the tractor 12. The rubber gasket 34 protects the side glass of the cab 11 and also helps to create a seal between the periscope 10 and the glass to help prevent dirt from accumulating within the periscope 10.

The periscope 10 is preferably mounted to the cab 11 of the tractor 12 by use of a horizontal brace 36 which can be bolted to the cab 11. The brace 36 is secured to the periscope 10 by a strap 38 which is wrapped around the periscope 10 and bolted to the brace 36. In addition, a cab hook 40 secured to the periscope 10 and is adapted to hook over a portion of the cab 11, helping to secure the periscope 10 to the tractor 12. The periscope 10 may optionally include a spotlight 42 mounted to the hood 32 of the periscope 10. The light 42 is used to illuminate the inside of the wagon 18 if the periscope 10 is used at night.

The convex mirror 30 may optionally be adjustable by the user to adjust the field of view through the periscope 10. FIG. 5 is an enlarged partial sectional view of the convex mirror 30 and the top portion of the hood 32. The mirror 30 is shown mounted to the hood 32 by a ball joint comprised of ball 44 and sleeve 46. The ball 44 is movable within the sleeve 46 such that the mirror 30 can be tilted in any direction desired.

When the periscope 10 is mounted to the side window of the cab 11 of the tractor 12 as shown in FIG. 1, FIG. 6 shows what the user would see through the bottom opening 24 of the periscope 10. As shown, the user is able to see the wagon 18, the auger 16, and the grain 20 being filled into the wagon 18. In this way, as the wagon 18 is being filled by the auger 16, the person in the cab 11 of the tractor 12 is able to see when the wagon 18 is full and can stop the flow of grain 20 into the wagon 18 accordingly.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of filling a wagon with grain from a grain cart comprising the steps of:

providing sides on said wagon;

providing a tractor having a cab with at least one window;

providing a grain cart having an auger for auguring grain from the grain cart to the wagon;

mounting a periscope to the tractor cab, wherein the periscope has a bottom opening facing the window of the cab and a top opening facing the wagon;

aligning the auger of the grain cart with the wagon;

activating the auger to start auguring grain into the wagon;

looking through the periscope to determine when the wagon is full of grain; and stopping the auger when it is determined that the wagon is full of grain.

2. The method of claim 1 further comprising the steps of:

providing a bottom mirror for the periscope, the bottom mirror being disposed near the bottom opening; and providing a top mirror for the periscope, the top mirror being disposed near the top opening of the periscope, wherein the top mirror has a convex shape for providing a wider angle view.

3. The method of claim 2 further comprising the step of adjusting the position of the top convex mirror to adjust the field of view.

4. The method of claim 3 further comprising the step of providing a ball joint operatively coupled between the periscope and the top convex mirror for allowing the top convex mirror to be adjusted.

5. The method of claim 2 further comprising the step of providing a hood formed at the top of the periscope, wherein the hood defines the top opening of the periscope.

6. The method of claim 5, wherein the hood is able to swivel relative to the periscope, the method further comprising the step of swiveling the hood to adjust the field of view.

7. The method of claim 5 wherein the top opening defined by the hood is larger than the bottom opening.

8. The method of claim 1 further comprising the step of adjusting the height of the periscope to allow a user to see over the sides of the wagon.

9. The method of claim 1 further comprising the step of providing a gasket formed around the bottom opening for providing a seal between the window of the cab and the periscope.

10. The method of claim 1 further comprising the steps of:

providing an elongated mounting bracket coupled to the periscope and disposed in a generally horizontal orientation; and bolting the mounting bracket to the cab of the tractor to mount the periscope to the tractor.

11. The method of claim 1 further comprising the step of mounting a spotlight to the periscope, wherein the spotlight is directed toward the wagon.

12. The method of claim 1 further comprising the step of providing a mounting hook on the periscope for attaching to the cab of the tractor.

13. An apparatus for monitoring a wagon from a cab of a vehicle while the wagon is being filled with grain comprising:

a periscope mounted to the cab of the vehicle, the periscope having a bottom end and a top end;

wherein the bottom end includes a first opening facing a window of the cab; and wherein the top end includes a second opening facing the wagon such that a user looking into the bottom end of the periscope can see inside the wagon through the periscope, thereby monitoring the filling of the wagon.

14. The apparatus of claim 13 wherein the periscope further comprises:

a bottom mirror formed near the bottom end of the periscope; and a top mirror formed near the top end of the periscope.

15. The apparatus of claim 14 wherein the top mirror comprises a convex shaped mirror.

16. The apparatus of claim 15 wherein the convex top mirror is adjustable.

17. The apparatus of claim 16 further comprising a ball joint coupled between the convex top mirror and the periscope for allowing the convex mirror to be adjusted.

18. The apparatus of claim 13 further comprising a gasket disposed at the first opening, wherein the gasket forms a seal between the periscope and the window of the cab.

19. The apparatus of claim 13 further comprising a hood formed at the top end of the periscope, wherein the second opening is defined by the hood, and wherein the second opening is wider than the remainder of the periscope.

20. The apparatus of claim 13 further comprising a horizontal mounting bracket coupled to the periscope and being adapted to be bolted to the cab of the vehicle.

21. The apparatus of claim 13 further comprising a downwardly facing hook coupled to the periscope for securing the periscope to the cab of the vehicle.

22. The apparatus of claim 13 further comprising a light coupled to the periscope to illuminate the wagon being filled with grain.

* * * * *